Aug. 18, 1925. 1,550,339
C. B. BRANSON ET AL
DEVICE FOR USE IN THE ARTICULATION OF ARTIFICIAL TEETH
Filed April 16, 1924  2 Sheets-Sheet 1
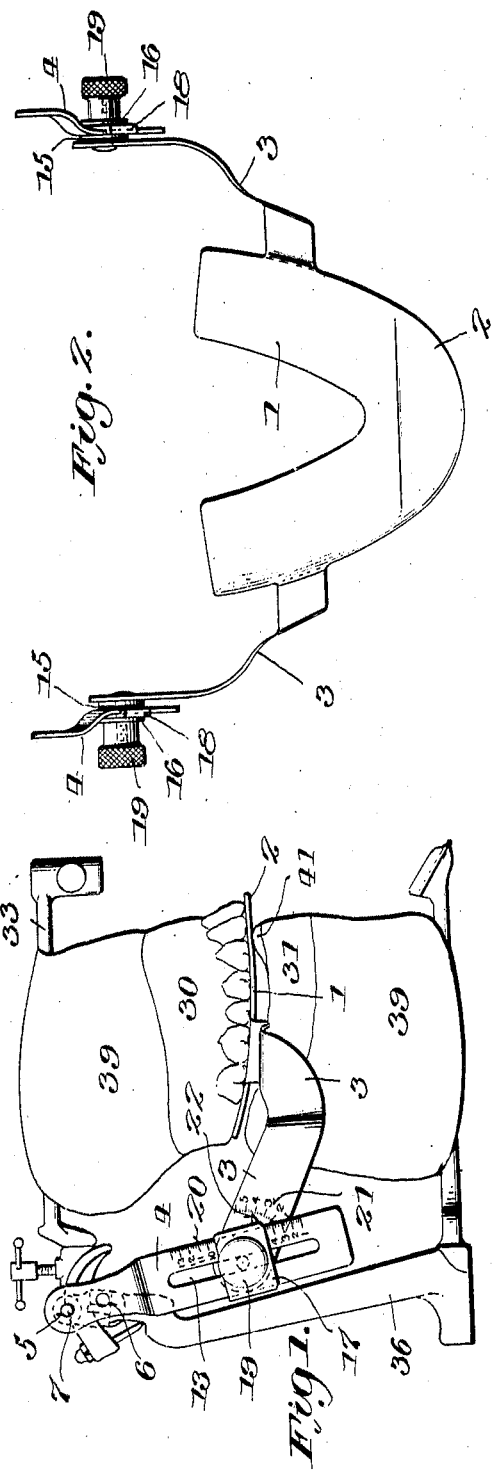
Inventor
Charles B. Branson,
William T. Humphrey,
By Steward + McKay
Their Attorney Aug. 18, 1925.  1,550,339
C. B. BRANSON ET AL
DEVICE FOR USE IN THE ARTICULATION OF ARTIFICIAL TEETH
Filed April 16, 1924  2 Sheets-Sheet 2
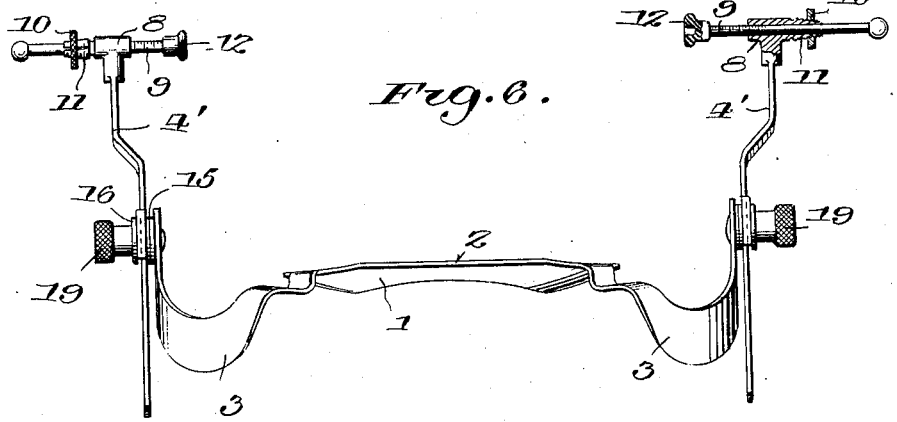
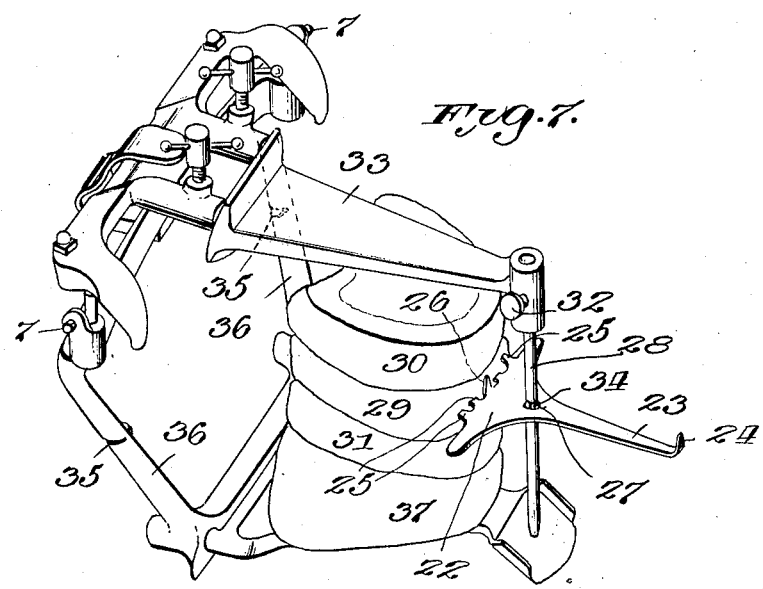
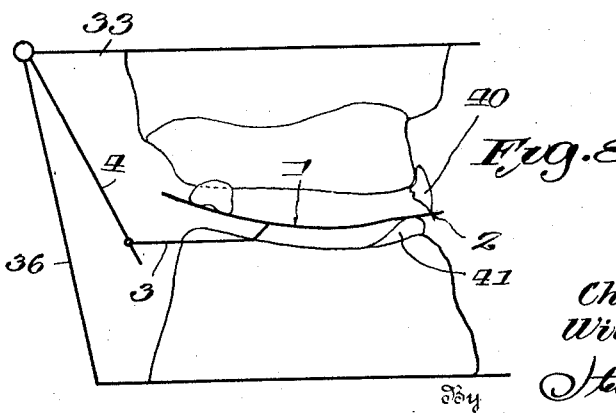
Inventor
Charles B. Branson,
William T. Humphrey,
Steward & McKay
their Attorneys Patented Aug. 18, 1925.

1,550,339

UNITED STATES PATENT OFFICE.

CHARLES B. BRANSON AND WILLIAM T. HUMPHREY, OF LINCOLN, NEBRASKA.

DEVICE FOR USE IN THE ARTICULATION OF ARTIFICIAL TEETH.

Application filed April 16, 1924. Serial No. 706,944.

*To all whom it may concern:*

Be it known that we, CHARLES B. BRANSON and WILLIAM T. HUMPHREY, citizens of the United States, residing at Lincoln, Lancaster County, State of Nebraska, have invented certain new and useful Improvements in Devices for Use in the Articulation of Artificial Teeth; and we do hereby declare the following to be a full, clear, and exact description of the invention, such as will enable others skilled in the art to which it appertains to make and use the same.

Our invention relates to a dental device for use in the articulation of artificial teeth; and more particularly to a device, employed as an accessory to a dental articulator (or mechanical jaw) to enable any dentist with but average skill to anatomically arrange artificial teeth in the original "set-up" with an accuracy and symmetry that is otherwise practically unobtainable through means heretofore at a dentist's disposal.

In the natural articulating arrangement of the teeth in the normal human subject, it is well known that the relative masticatory movement is not confined to an up-and-down chopping action of the lower jaw, but because of the peculiar construction of the temporo-mandibular joint a laterally swinging movement of that jaw is also made possible, thereby permitting food to be effectively ground through such lateral triturating action. And for the efficient operation of artificial dentures, it is of fundamental importance that the teeth be so anatomically arranged as to permit such free lateral movement with effective grinding action—a result that our device renders readily possible through simple means.

Under the usual practice in arranging artificial teeth on a denture, in order to attain anything like an anatomical articulation, a dentist ordinarily employs an "anatomical" articulator, one comprising upper and lower jaw members and having an articular connection simulating the movements of the condyles in the normal human subject. While accessory devices are available for use with such an instrument to enable the dentist to accurately position the jaw models upon the upper and lower jaw members of the instrument in substantially the same relationship to each other as existed in the patient's mouth, neither the articulator itself nor the accessory devices referred to, form a guiding means for the actual setting of the teeth in the trial plates so that the occlusal surfaces of the opposing teeth will properly engage in the lateral grinding or masticating movements referred to. The chief usefulness of the anatomical articulator, after the teeth have been set, is to give the lateral grinding movements to the opposed-dentured models simulating the natural jaw movements, thereby merely enabling the dentist to determine whether the teeth which he has set coact properly during such movements.

As the proper anatomical relationship between the upper and lower artificial teeth has much to do with the stability and masticating efficiency of such teeth, enabling a close grinding action between the opposing jaws, with the proper balancing of the denture and prevention of leverage strain when biting on one side, an efficient guiding means for the proper setting of the teeth in the wax trial plates so as to accurately predetermine the results is obviously extremely desirable.

The most notable proposals of the prior art in respect to such guiding means have been along the line of the provision of a rigid guide plate having a surface conforming to the average of curves of the occlusal surfaces of the teeth in normal human subjects, the guide plate to be mounted either upon the articulator frame to extend between the jaw members of that instrument in position disposing its guiding surface in a fixed relation to the jaw models for the setting of the teeth of the upper or lower jaw thereagainst, or wholly upon a specially prepared foundation of wax or the like to dispose the guide plate in the required relation to one or both of the jaw models.

One such proposal of the prior art utilizes a guide plate having an upper curved guiding surface determined from the average of curves of the occlusal surfaces of the upper set of teeth taken from a large number of cases, this guide plate being mounted on a foundation of wax or the like built up to the desired height with respect to the upper jaw model on the articulator for the setting of the upper teeth against the guiding surface of the plate. Another such proposal of the prior art comprised a guide plate forming a triangular portion of a sphere of 8-inch diameter and conforming to the curve of Spee defining the average curve of the occlusal plane of the lower set of teeth in human subjects, that curve becoming at the incisive edges of the incisors, passing over the crests of the buccal cusps of the lower bicuspids and molars and ending in the anterior border of the condyloid process. In this last mentioned device of the prior art, the guide plate was mounted in a carrier pivoted to the side portions of the articulator representing the condyles of the human jaw so as to bring the guide plate into position for use in the occlusal plane between the upper and lower jaw models and in a predetermined fixed position with respect to those models, whereupon the lower teeth were to be first set against the guide plate and thereafter the upper teeth set in articulating relation with the lower.

So far as we are aware, no guide-plate device of the prior art has come into general or even substantial use, due in the main, our investigations indicate, to the lack of adaptability of those devices to differing characteristics of individual cases. This, we have found, is not generally due to an incorrect contour of the guiding surface of the guide plate or to a contour of the guiding surface not adapted for use in the majority of cases. While the guiding surfaces of such guide plates (whether conforming to the average of curves of the occlusal plane of the teeth as actually found in a large number of human subjects or to an established anatomical theory of an average curve, such as the curve of Spee), may be capable of utilization in substantially all cases, such utilization cannot be efficiently practiced or meet the conditions of individual variations unless the guide plate bearing the guiding surfaces upon one or both of its faces is bodily adjustable with respect to the jaw models after those models have once been mounted on the articulator in that relationship substantially as found in the patient's jaws. One chief defect in the prior art devices has been this lack of adjustability bodily of the guide plate with respect to the jaw models upon the articulator, the necessity for which will appear from the following considerations.

In order to reproduce in the artificial dentures the anatomical relation of the teeth originally existing in the patient's mouth and the proper facial expression, the jaw models must first be accurately mounted on the articulator in substantially the same relation to each other and to the articulator as exists in the patient between the jaw and the mandible. This is done in the well known manner by first obtaining a "bite" of the patient's jaws to show their relationship to each other when in natural position of rest, including their normal spaced relation as though the natural teeth were intervening, the technique also involving, among other measurements, the determination of the lip line between the jaws. By means of a face bow or other accessory device, the "bite", with the jaw models set into the indentations produced by the natural jaws therein, is then transferred to the articulator, the jaw models secured thereon in their proper relation established by the "bite" and the "bite" then removed. The jaw models, thus mounted and spaced, are covered with sheet base wax upon which the artificial teeth are to be arranged and temporarily attached. In the generally followed and most approved practice, the two upper incisor teeth are first set in the wax base of the upper case, with their cutting edges extending down to the lip line, according to the measurements taken on the "bite". As the length to which the two upper front or incisor teeth are built down is determined by the individual's lip line and the expression produced, obviously a guide plate, if utilized between the jaw models in setting the remaining teeth of the upper jaw, must necessarily be adjustable. In fact, in practice it is found that practically every case will differ from another, after the jaw models have been mounted, in the height and inclination as well as in the forward or rearward body position required of the guide plate in the setting of either the upper or the lower denture upon the guide plate.

Accordingly, primary objects of our invention are the provision of a rigid guide-plate device of the general character referred to adapted for use as an accessory with any standard type of dental articulator, and bodily adjustable with respect to the jaw models thereon so as to adjustably vary the height and inclination of the guide-plate curve both longitudinally and transversely and its forward or rearward position, with respect to the jaw models.

Another object of our invention is to provide a guide-plate device of the character referred to which may be readily attached to and removed from the articulator upon which it is used.

Still another object of our invention is to provide such an adjustable guide-plate device having means for releasably locking the adjustments. A further object is to provide, in association with such adjusting and locking means, an adjustment-indicating means whereby the device, after a preceding adjustment, use and removal from the articulator, may be remounted thereon in its precise preceding position of adjustment. The provision of such an adjustment-indicating means, we have found in practice, to be particularly desirable, greatly simplifying the technique required in the making of satisfactory dentures, and substantially increasing the usefulness and practical value of the device to the operator. When the dentures have been entirely completed, with the teeth rigidly fixed in their permanent denture plates, it is considered essential to good practice to true up any deviations that may have taken place in transferring the teeth from a wax base or plate to a rigid one, and to retouch and resharpen the grinding surfaces and cusps, in order that the teeth may have greater freedom as to lateral motion in mastication and be capable of the most effective grinding and cutting action. All this can be most effectively done, however, only by a remounting of the dentures in their original positions on the articulator. Such remounting, ordinarily difficult if not impossible, becomes a simple matter when an adjustable guide-plate device, having means for indicating and resetting its original adjustment, is employed on the articulator as a remounting guide.

The objects and principles of our invention, including the foregoing objects and principles, will more fully appear from a concrete embodiment thereof hereinafter described and illustrated in the accompanying drawings forming a part hereof. It is to be understood, however, that the concrete embodiment referred to is merely illustrative of our invention, and that modifications thereof and differing concrete embodiments may be made within the broad scope of the invention and as defined in the appended claims.

In the drawings:

Fig. 1 is a side elevational view showing a well known type of dental articulator, known to the dental profession as the Gysi simplex articulator, with a guide-plate device embodying our invention attached thereto in operative position surmounting a lower jaw model and surmounted by an upper jaw model with the upper trial plate and teeth set therein against the curved upper surface of the guide plate;

Fig. 2 is a top plan view of the guide-plate device shown in Fig. 1 but detached from the articulator;

Fig. 3 is a front-end elevational view of the guide-plate device shown in Fig. 2;

Fig. 4 is an enlarged partial side elevational view of the same device;

Fig. 5 is a detailed cross-sectional view on the line 5—5 of Fig 3;

Fig. 6 is a front end elevational view of a modified form of the device shown in Fig. 3;

Fig. 7 is a top-front perspective view of the articulator with the upper and lower jaw models freely positioned thereon, a wax "bite" between the models and a mounting guide inserted in the wax "bite" to determine the position of the "bite" and jaw models on the articulator;

Fig. 8 is a diagrammatic illustration of the use of the guide plate device in setting the upper denture.

It is to be understood that our invention in its broadest scope is not limited to any particular curvature of the guide plate but includes any curvature found in practice to offer an efficient guide for the setting of the teeth in their required articulating relation. In the present illustrative embodiment of our novel guide-plate device, however, utilization is made in the construction of the guide plate itself of the established principle, hereinbefore briefly referred to, that the surface curvatures of the average set of perfect natural teeth conform to an 8 inch sphere, the longitudinal circle normally cutting through the condyloid process of the jaw. This principle is more particularly true as to the lower set of teeth, for in the normal subject, the upper incisors alter the anterior portion of the curvature referred to by an extension below its plane approximately to the lip line, these upper incisors overlapping the lower ones. When a guide plate is to be utilized in first setting the lower teeth in the wax trial plate, our invention contemplates, therefore, that if a spherically curved guide plate is used, it shall be of true spherical curvature throughout but that where the upper teeth are to be first set, a guide plate of spherical curvature except for an anterior somewhat flattened portion for engagement therewith of approximately the first six front teeth shall be employed. For the sake of both mechanical convenience and proper appearance and expression, the approved and generally followed practice is to arrange the upper teeth first, and for those reasons the present illustrative embodiment of the invention employs a guide plate of the contour for the setting of the upper teeth thereagainst.

A guide plate having its rear two-thirds portion of the spherical curvature stated, that is conforming to a sphere of 8 inch diameter, and its anterior third flattened to a plane which is tangent to the arc of curvatures at the center point of the juncture of the two portions of the plate, has been found in practice to give satisfactory results in the utilization of the guide plate. Such a guide plate, with the spherically curved portion and a flattened anterior portion indicated by the numerals 1 and 2, respectively, is shown in plan view in Fig. 2, in end elevational view in Fig. 3, in side elevational view in Fig. 4, and in mounted position on an articulator in Fig. 1 with the upper set of teeth completely arranged thereagainst. It is to be understood, however, that this particular arrangement of the curved and plane portions of the guide plate is not essential to the practice of our invention. Moreover, in some instances it may be found desirable to depart from the true spherical form of the major portion of the guide plate. We have found that in some cases, the transverse curvature of the guide plate may be sharpened to a three inch radius with good effect, that is a guide plate of the general contour shown in the drawings but with its median longitudinal curve on the arc of an 8 inch circle and its median transverse curve on the arc of a 6 inch circle, may be satisfactorily employed, particularly where the denture is otherwise disposed to tip laterally in mastication, a guide plate of such contour producing a denture tending to resist the lateral tipping referred to.

In its illustrative embodiment shown in Figs. 1 to 5 inclusive, the guide plate device as a whole comprises the guide plate itself, side arms or wings 3 and adjustable end members 4, adapted to adjustably attach or mount the device upon any standard articulator or other suitable mounting frame for use.

The arrangement and contour of the side wings 3 substantially contribute to the secure mounting of the guide plate in position for use, to the unobstructed mounting of the jaw models and trial plates and to the convenience of the operator in unobstructed access to the guide plate, the jaw models and the trial plates in forming the dentures. The juncture of those side wings with the guide plate, as shown more particularly in Fig. 3, is below the top surface of the plate, and each side wing extends first downwardly and then outwardly to wholly clear the top surface and side edges of the plate. It is further to be noted that the juncture of the wings 3 with the guide plate is lateral and anterior to the rear edge or heel of the plate. This is a detail of some importance in the adjustment of the guide plate to the jaw model, and particularly to the lower jaw model, inasmuch as the heel portion of that model often curves upwardly to such an extent that a rear extension of the guide plate attachment would so interfere with the heel portion of the model as to prevent the mounting or proper adjustment of the guide plate with respect to the model unless the heel portion of the model were cut away to an extent that would be ruinous. The side attachment of the lateral wings 3 of the guide plate, outspreading wide enough to clear the widest jaw model and low enough to be out of the operator's way, is, therefore, a structural arrangement of considerable practical importance. Moreover, the lateral wings 3, by reason of the resiliency of their metallic structure and their contour and arrangement referred to, including their rearward extensions as shown in the plan view of Fig. 2, provide, as will more fully hereinafter appear, a spring compression effective upon the end attachment members 4 to bind those members against the supporting lugs on the articulator or other mounting frame. In its preferred embodiment, the parts of the device just described are formed of spring brass or steel, of sufficient thickness of the various parts to provide the required rigidity of the plate and ample spring strength of the side arms or wings 3.

In the illustrative embodiment of the invention shown in Figs. 1 to 4 inclusive, the end members 4 are provided each with an upper and a lower aperture 5 and 6 designed for the insertion through either of supporting lugs for the mounting of the guide plate. The face bow lugs found upon all standard dental articulators, and indicated by the numeral 7 on the Gysi articulator shown in Figs. 1 and 7, provide a simple and effective source of attachment of the end members of the guide plate device, in the manner shown in Fig. 1, when the device is used with such an articulator.

As shown more particularly in Figs. 2 and 3, the outer end portions of the attachment members 4 are offset, and these attachment members are reversible in position upon the extensions of the side wings 3 to adapt the device to articulators of different widths. The Gysi articulator, upon which the device is shown mounted in Fig. 1, is an exceptionally wide one as to the distance between the two face bow lugs, while the average size is substantially that of the well known Snow articulator. The reversibility of the attachment members 4, supplemented if necessary by washers about the pivotal connection between the members 4 and the lateral wings 3 of the device, have been found in practice to give a sufficiently wide range of adjustment as to span of the members 4 to adapt the device to all standard articulators in use.

To provide a finer adjustment in the respect last mentioned and over a wider range and to also provide for a lateral body adjustment of the guide plate upon the articulator if found desirable, modified attachment members 4', as shown in Fig. 6, may be employed. As there shown, the end portions of the attachment members 4' are formed with rounded T-shaped terminals 8, the transverse portion of each terminal being bored to form a bearing therethrough for the adjusting rods 9, which are longitudinally movable through the bore referred to. These rods 9 are adapted to be locked in any position to which they may be adjusted by means of clamping nuts 10, engaging the externally threaded and tapering split ends 11 of the transverse portions of the terminals 8. The inner ends of these adjusting rods are provided, as shown in Fig. 6, with equidistant graduations or scores, by means of which both of these rods may be adjusted to the same distance from the bearings in which they are mounted. The inner ends 8 of the rods 9 are provided with socketed heads 12 for the reception therein of the projecting ends of the lugs 7 of the articulator.

As hereinbefore stated, an important object of the invention is to provide means for bodily adjusting the guide plate when mounted on the articulator or other supporting framework. Various means other than those here shown for mounting the device for use with the articulator and for adjusting the guide plate with respect to the jaw models may be employed. The particular means here shown and thus far described and further to be described, however, have been found to work satisfactorily and are employed in the preferred embodiment of the invention.

As shown more particularly in Fig. 1, the end attachment members 4 are each provided with a longitudinal slot 13, designed to receive therethrough, and in various positions of adjustment therealong, a pivot pin or stud 14 (Fig. 5) fixedly anchored in the extended end portion of each side wing 3, the pivot stud 14 being of a diameter to provide a free sliding and pivotal movement of the end member 4 thereon. Washers 15 and 16 may desirably be positioned upon the stud 14, one or more between the member 4 and the wing 3 and another against the outer side of the member 4, as shown in Fig. 5. A centrally apertured side plate 17 is mounted upon the stud 14 flatly against the member 4 and is provided with curved flanges 18 upon its opposite longitudinal sides to engage closely about the side edges of the member 4. A thumb nut 19, threaded to engage the protruding threaded end of the stud 14, completes the adjustable connection between each end member 4 and the extended end of each side wing 3, the turning of the thumb nut in opposite directions serving to lock the end members 4 and the side wings 3 in their relative positions of adjustment and to release the locked engagement for purposes of further adjustment. A numerically marked scale 20 on each face of the side member 4, extending longitudinally thereof, serves, in association with the upper edge of the side plate 17, to indicate the extent of sliding adjustment of each pivotal stud 14 of the side wings 3 along the slot 13 of each attachment member 4. This adjustment, when the device is mounted on the articulator as shown in Fig. 1, effects the upward or downward adjustment of the side wings 3 and consequently of the guide plate 1. An arc-shaped and numerically marked scale or dial 21 on each side wing 3 serves, in association with the pointer 22 extending from a side edge of the plate 17, to indicate the extent of swinging or angular adjustment of each side wing 3 with respect to the corresponding end member 4. It will be observed that the opposite side wings 3 and end members 4 are separately adjustable so that identical or differing adjustments may be made on the two sides.

It is apparent from the structure and arrangement of parts just described that, when the device is mounted on the articulator as shown in Fig. 1, or other mounting frame, the possibilities of adjustment are such that the guide plate may be raised or lowered or shifted forward or backward with respect to the jaw models and without alteration of its plane of curvature with respect to those models and also that the inclination of the plate may be varied with respect to the jaw models in a forward, backward or lateral tilt, as desired. It is also apparent that the extent of the various adjustments are clearly indicated and those indications may be utilized for subsequent resettings of the adjustment, and that when desired the adjustments may be maintained by locking the relatively movable parts in their adjusted relationship. It is further to be observed that the adjustment means provides for accurately gauging the relationship of the two sides of the device so as to provide symmetry, and fixing this relationship so that it may be maintained or restored even though the device has been detached from its position of use. This enables the utilization of the guide plate again if some after changes are required in the trial or completed dentures, changes being almost invariably required in the case of the trial dentures after they are tried in the mouth prior to final adjustment and completion.

A brief outline of the procedure involved in the mounting of the jaw models and the use of the guide-plate device in forming the dentures, will further show the principles of operation of the device and its advantageous features. The jaw models having first been formed, the wax "bite," with the opposed jaw models set into the indentations therein, is then transferred by means of a face bow or other accessory device to the articulator with the jaw models in the same general relation to each other and to the jaw members of the articulator as existed in the mouth between the corresponding representative parts. As a substitute for the face bow, we employ in associated use with our guide-plate device, the novel mounting guide shown in perspective view in Fig. 7, and have found its use to give satisfactory results in accuracy of mounting of the jaw models while at the same time shortening and simplifying the bite transfer procedure.

The mounting guide referred to has a flat faced head portion 22 of general triangular shape with an arm 23 projecting from the apex of the triangle and in the plane of the head, the handle having an upstanding pointed terminal 24. A plurality of prongs 25 project from the base of the triangular head and in its plane while a single centrally disposed prong 26 projects upwardly at right angles to the plane of the head. The arm 23 is perforated as shown at 27 for the reception therethrough of the incisor guide pin 28 of the articulator when the bite guide is in the position shown in Fig. 7.

While the "bite" wax is still between the patient's jaws, the fork-like mounting guide is inserted in the wax, between the patient's lips, the head of the guide being set on a horizontal line where the lips meet, the upwardly projecting prong 26 being set to indicate the exact center of the mouth and face, and the outwardly projecting arm 23 set parallel to a line projected from the opening in the ear to the lower side of the nose. By these settings, the base edge of the head portion of the bite guide indicates the patient's lip line, the projecting arm indicates the biting plane and the upwardly extending center prong, the center line of the face through which extends the front-to-rear vertical bisecting plane of the head. The "bite" having been taken, the wax "bite," with the guide still secured therein is then removed from the mouth. The jaw models are then set into the indentations in the wax "bite" made by the patient's own jaws, thus reproducing between the jaw models the mouth relations of the patient's jaws. The jaw models are lightly attached to the wax "bite" to maintain their positions immovable, and these models with the wax "bite" and the guide in position are then set on the articulator as shown in Fig. 7, the jaw models being indicated by the numerals 30, 31, and the wax "bite" between them by the numeral 29. The articulator pin 28 is then slipped through the aperture 27 of the guide arm and the lock-screw 32 made secure, the pin automatically centering the bite with the articulator in one relation. The arm 23 of the guide is then alined with the upper support or jaw member 33 of the articulator, thus establishing another relation of the parts. The models are then adjusted until the base edge of the guide, which indicates the lip line, is horizontal and the projecting arm of the guide is on a line with the notch 34 in the articulator pin in front and the notches 35 in the legs 36 of the articulator frame in the rear, the lower model being supported in this position by soft wax, indicated at 37 in Fig. 7. These adjustments in mounting have been made, the jaw models are secured by plaster of Paris, as indicated at 39, Fig. 1, to the upper and lower jaw members of the articulator.

With the models securely attached to the articulator in the proper relationship established by the "bite" and the mounting guide, the center face line established by the mounting guide is extended to the models and a measurement taken of the distance between the models and the lip line as indicated by the mounting guide. The wax "bite" and guide are then removed from their position between the models shown in Fig. 7. The spaced models are then covered with sheet base wax, upon which the artificial teeth are to be arranged and temporarily attached. The two upper incisor teeth, one of which is indicated at 40 in diagrammatic Fig. 8, are then set in the wax base of the upper case with their cutting edges extended to the lip line according to the measurements taken.

Then opening the articulator so as to permit the guide-plate device to be attached thereto, the end members 4 are sprung over the face-bow lugs 7, the inherent springiness of the side wings 3 effecting a spring compression tending to retain the end members upon the lugs 7. The thumb nuts 19 are loosened slightly, and the guide plate is moved forwardly to dispose its anterior portion 2 about one-eighth of an inch beyond the edges of the incisor teeth, as shown in Fig. 8. Under this anterior part of the plate a lump of wax, indicated at 41 in Figs. 1 and 8, may be placed as a support, to elevate the plate in front into contact with the incisors set as described while its rear end is adjusted to equal heights and angles upon opposite sides by the adjusting means described in detail above. The adjustment should generally be such as to present just sufficient space between the guide plate and the heels of the upper jaw model to permit the insertion of the second molars between the model and the plate, with the molars set close to the ridge of the jaw model to prevent undue leverage strain in mastication and with the cusps of the molars in contact with the plate. With the adjustment of the guide plate completed, the thumb nuts 19 are tightened to secure the adjustment, and the setting up of the remaining teeth may be proceeded with, the teeth being set with all their cusps in contact with the plate, as shown in Fig. 1.

The upper teeth having thus been set, the guide-plate device is removed and the lower teeth articulated with the upper teeth already anatomically set up. Before removing the guide-plate device, however, a record is made of the readings on the scales 20 and 21 of the positions of adjustment for future reference.

After both dentures have been arranged upon their wax bases, they are removed from the models and tried in the mouth, to determine whether any changes are advisable as to appearance or mechanical or anatomical relationship before the dentures are completed in permanent bases of hard rubber or metal. Very frequently it becomes advisable to make some change which requires the use of the guide plate again in its precise position of adjustments as before, such, for example, as a change of teeth for others of different size or color. In such a case the graduated scale markings on the guide-plate device and the record made of the preceding adjustments enable the ready remounting of the guide plate in its precise preceding position. Other changes found advisable to be made in the dentures, such for example as the lengthening or shortening of one set or the other, or changing the height of one side only, in case of inaccurate mounting of the jaw models, require a remounting of the guide-plate device on the articulator in a different position of body adjustment of the guide plate with respect to the jaw models than the preceding one.

When the dentures have been entirely completed, with the teeth rigidly fixed in their permanent denture bases, it is considered essential to good practice to remount these dentures upon the articulator for the purpose of truing up any deviations that may have occurred in the transfer of the teeth from a wax base to a rigid one. Also, it is essential for best results to retouch and resharpen the grinding surfaces and cusps, in order that the teeth may have greater freedom as to lateral movement in mastication, and be capable of the most effective grinding and cutting action. The re-mounting of a case upon the articulator in its original relationship is, however, ordinarily not only difficult but almost impossible, and with only an approximation of the original relationship expected. But with the present adjustable guide-plate device, with its provisions for indicating and resetting its original adjustment, it becomes a simple matter to restore the case in its original position and relationship. To accomplish this, the guide-plate is reset on the articulator in its original position as per the record of its initial adjustments. The upper denture is set in place with the plate as a mounting platform or guide and then attached to the upper jaw member of the articulator. The guide-plate device is then removed and the lower denture is positioned with its teeth in proper antagonizing relation with the teeth of the upper denture, and the lower denture attached to the lower jaw member of the articulator.

The capability of use of our guide plate device in the accurate remounting of the completed dentures is of very material importance and broadens the field of usefulness of the device to a very considerable extent, for because of the inaccuracy and difficulty ordinarily involved in the remounting of the dentures, the average dentist foregoes this important finishing work upon the dentures, to the detriment of masticating efficiency of the dentures and a lowered service value to the user. But with the accurate remounting of the dentures insured by the use of our guide plate device, the dentist can get the lateral movements of the dentures which the articulator provides, and the finishing work can be then completed rapidly and effectively. As one example of a technique which may be employed in such finishing work, and made possible only by occurate remounting of the dentures on the articulator, some vaseline and carborundum powder having been placed between the opposing artificial teeth, upon operating the articulator to shift the dentures laterally as in mastication, the occluding teeth may be worn into such close "meshing" relationship that their efficiency in the cutting and grinding of food in the patient's mouth will be very substantially increased.

What is claimed is:

1. A device for use in setting up dentures comprising, in combination, a plate of hard material shaped to present a surface curvature corresponding to the points or cusps of the occlusal or grinding surfaces of the artificial set of teeth to be produced as the result of setting up the denture upon said plate and means for attaching said plate to a suitable framework mounting, said means comprising attachment members connected to said plate and bodily adjustable angularly with respect to said plate.

2. A device for use with a dental articulator in setting up dentures, comprising a rigid plate shaped to present a surface curvature corresponding to the points or cusps of the occlusal or grinding surfaces of the artificial set of teeth to be produced as the result of setting up the denture upon said plate and means for supportably attaching said plate directly to said articulator in position for setting up a denture upon said plate, said means comprising members effecting the attachment to said articulator and connected to said plate and angularly and longitudinally adjustable with respect to said plate.

3. A device for use with a dental articulator of the type having a support or pivot positioned to correspond with the articular surface of the temporo-mandibular joint in the human subject, said device comprising a guide plate for the setting up of a denture thereagainst, and means pivoting said guide plate to said support on said articulator, said means including connecting members relatively adjustable to elevate and lower said guide plate and to vary the inclination thereof, and means to secure said connecting members relatively immovable in their relatively adjusted positions.

4. A device for use with dental articulators of the type having oppositely disposed face-bow lugs, said device comprising a guide plate for the setting up of a denture thereagainst, and means pivoting said guide plate to said face-bow lugs on said articulator, said means including oppositely disposed and separately adjustable pairs of connecting members, the members of each pair being angularly adjustable and slidably adjustable one longitudinally of the other.

5. A device for use with dental articulators of the type having oppositely disposed face-bow lugs, said device comprising a rigid plate of a surface contour adapted to function as a guide for the setting up of a denture thereagainst and spring-compression means for securely attaching said plate to said lugs of the articulator, said spring-compression means comprising resilient metallic arms extending from said plate and terminal members on said arms adapted to engage about said lugs.

6. A guide-plate device for use in setting up dentures, comprising a rigid plate of a surface contour adapted to function as a guide in setting up a denture thereagainst, opposite side arms extending from said plate, opposed terminal attachment members, one for each of said arms, and means adjustably mounting said attachment members on said arms whereby their effective span may be adjustably varied.

7. A guide-plate device for use in setting-up dentures, comprising a rigid plate of a surface contour adapted to function as a guide for the setting up of a denture thereagainst, arms extending from said plate, reversible attachment members having offset terminals and means for reversibly mounting said attachment members on said arms.

8. A guide-plate device for use in setting up dentures, comprising a rigid plate of a curvature adapted to function as a guide for the setting up of a denture thereagainst, arms extending from said plate, reversible attachment members having offset apertured terminals and means for reversibly mounting said attachment members on said arms.

9. A guide-plate device for use in setting up dentures, comprising a rigid plate of a surface contour adapted to function as a guide for the setting up of a denture thereagainst, arms extending from said plate, terminal attachment members for said arms, means mounting said members on said arms for adjustment of said members bodily to different angular positions with respect to said arms, and means adapted to releasably lock said parts in adjusted position.

10. A guide-plate device for use in setting up dentures, comprising a rigid plate of a surface contour adapted to function as a guide in setting up a denture thereagainst, arms extending from said plate, terminal attachment members for said arms, and means mounting said members on said arms for relative angular adjustment and relative slidable adjustment one longitudinally of the other.

11. A guide-plate device as set forth in claim 10, and having means adapted to releasably lock said arms and terminal attachment members in adjusted position.

12. A guide-plate device for use in setting up dentures, comprising a rigid plate of a surface contour adapted to function as a guide in setting up a denture thereagainst, arms extending from said plate, terminal attachment members for said arms, means mounting said members on said arms for relative angular adjustment and relative slidable adjustment one longitudinally of the other, means for indicating the relative angular and longitudinal adjustments of said arms and terminal attachment members, and means for releasably locking said arms and terminal attachment members in adjusted positions.

13. A guide-plate device of the character referred to comprising a rigid guide-plate, opposite side arms extending therefrom, terminal attachment members, one for each said arm, and adjustable connecting means between each arm and attachment member, said means comprising a threaded pivot stud mounted in one of said connected parts and extending through a slot in the other and means adapted to releasably lock said parts relatively immovable.

14. A guide-plate device for use in setting up dentures, comprising a rigid plate of a surface contour adapted to function as a guide in setting up a denture thereagainst, opposite side arms extending from said plate, a threaded pivot stud upon each said arm, longitudinally slotted attachment members, one for each of said arms, adapted to be mounted on said pivot stud with said stud slidable along said slot, and a thumb nut for each said pivot stud adapted to releasably lock each said arm and attachment member relatively immovable.

15. A guide-plate device for use in setting up dentures, comprising a rigid plate having a surface contour adapted to function as a guide in setting up a denture thereagainst and side arms or wings extending from opposite side edges of said guide plate outwardly and rearwardly of said guide plate.

16. A guide-plate device for use in setting up dentures, comprising a rigid plate having a surface contour adapted to function as a guide in setting up a denture thereagainst, resilient metallic side arms or wings extending from opposite side edges of said guide plate downwardly and outwardly in spreading relation and then rearwardly of said guide plate, said arms being provided with terminal attachment members.

17. A device for use with dental articulators of the type having oppositely disposed face-bow lugs, said device comprising a guide plate for the setting up of a denture thereagainst, and means pivoting said guide plate to said face-bow lugs on said articulator, said means including oppositely disposed attachment means between said plate and said face-bow lugs adjustable to effect forward and backward adjustment of said plate in the desired occlusal plane in the mounted position of said plate.

18. A dental appliance for setting up dentures, comprising, in combination, a guide plate for setting up of a denture thereagainst, pivotal bearings adapted to mount said plate in the desired occlusal plane between forms in an anatomical articulator and means to effect a relative lateral or side to side adjustment of said plate with respect to said forms without disturbing the mounted position of said plate in said desired occlusal plane.

19. A device for use with dental articulators of the type having oppositely disposed face-bow lugs, said device comprising a guide-plate for the setting up of a denture thereagainst, and means pivotally supporting said guide-plate from said face-bow lugs in the mounted position of said plate, said means including connecting-member means between opposite sides of said plate and said face-bow lugs separately adjustable to independently adjustably vary the height of opposite sides of said plate in mounted position.

In testimony whereof we hereunto affix our signatures.

CHARLES B. BRANSON.
WILLIAM T. HUMPHREY.